United States Patent [19]

Mabuchi

[11] Patent Number: 4,705,978

[45] Date of Patent: Nov. 10, 1987

[54] BRUSHGEAR FOR MINIATURE MOTORS

[75] Inventor: Takaichi Mabuchi, Matsudo, Japan

[73] Assignee: Mabuchi Motor Co., Ltd., Japan

[21] Appl. No.: 838,105

[22] Filed: Mar. 10, 1986

[30] Foreign Application Priority Data

Mar. 12, 1985 [JP] Japan .................................. 60-48744

[51] Int. Cl.[4] ............................................ H02K 13/00

[52] U.S. Cl. .................................... 310/248; 310/233; 310/239; 439/13

[58] Field of Search ............... 310/244, 248, 249, 251, 310/252, 239, 233, 237, 238, 213, 232, 51, 40 MM; 200/164 R, 164 A, 252, 257, 284; 339/5 R, 5 M, 5 P, 5 S, 8 R

[56] References Cited

U.S. PATENT DOCUMENTS

| | | | |
|---|---|---|---|
| 823,642 | 6/1906 | Siebers | 310/248 |
| 4,319,153 | 3/1982 | Mabuchi | 310/233 |
| 4,323,292 | 4/1982 | Lewis | 339/5 M |
| 4,500,804 | 2/1985 | Akiyama | 310/219 |
| 4,572,599 | 2/1986 | Pryputniewicz | 339/5 P |

FOREIGN PATENT DOCUMENTS

| | | | |
|---|---|---|---|
| 1246325 | 10/1985 | France | 339/5 R |
| 0014341 | 1/1984 | Japan | 310/244 |

*Primary Examiner*—R. Skudy

*Attorney, Agent, or Firm*—John J. McGlew

[57] ABSTRACT

Brushgear for miniature motors comprising a pair of brushes each having brush shoes, made of electrically conduction metal strips, for making sliding contact with a miniature motor commutator, in which each brush shoe is bent into a V shape in cross section; ends of the feet of the V-shaped brush shoe being adapted to make sliding contact with the commutator, and the sliding positions of the brush shoes of the two brushes are disposed apart from each other by a predetermined distance in the axial direction of the commutator and/or in an inclined state in the axial direction of the motor rotating shaft at a predetermined angle with respect to the tangential direction of the commutator.

1 Claim, 12 Drawing Figures

BRUSHGEAR FOR MINIATURE MOTORS

BACKGROUND OF THE INVENTION

This invention relates generally to brushgear for miniature motors, and more particularly to brushgear for miniature motors comprising a pair of brushes each having brush shoes, made of electrically conductive metal strips, for making sliding contact with a motor commutator, in which each brush shoe is bent into a V shape in cross section; ends of the feet of the V-shaped brush shoes being adapted to make sliding contact with the commutator.

DESCRIPTION OF THE PRIOR ART

In an electric motor in which current is fed to rotor windings via brushes, it is generally of critical importance to stabilize the state of contact between a commutator connected to the rotor windings and the brushes. If the brushes and the commutator are kept in an unstable contact, not only current feeding to the rotor windings becomes unstable but also unwanted electrical noises or sparks may be generated, leading to severe abrasion of both the commutator and the brushes and reduced service life of the motor in extreme cases.

Heretofore, metallic brushes, as shown in FIGS. 7 (A), (B) and FIGS. 8 (A), (B), are well known as brushes for use in miniature motors. In FIGS. 7 (A), (B) and FIG. 8 (A), (B) a brush base 3 is supported by a motor case cover (not shown), for example, and brush shoes 1 are adapted to make sliding contact with a commutator 4 in a state where brush arms 2 are bent toward the commutator 4.

The sliding contact between the brush shoes 1 and the commutator 4 can be improved by increasing the pushing force of the brush shoes 1 against the commutator 4. (It is not desirable, however, to increase the brush pressure to an excessive level because mechanical abrasion could result.) Since the brush pressure can be obtained by the elasticity produced by the bent brush arms 2, the brush pressure can be increased to a certain extent by increasing the degree of bending, but not to an extent exceeding the elastic limit of the brush arms 2. Consequently, it has been conceived that the brush pressure per unit area is increased by reducing the contact area of the brush shoes 1 with the commutator 4 by the use of brushgear as shown in FIGS. 7 (A), (B), and FIGS. 8 (A), (B). An example of the conventional type brushgear shown in FIG. 7 (A) has brush shoes 1 each formed into a V shape in cross section so that corners 1A, 1A and 1A of the V-shaped brush shoes 1 make contact with the commutator 4. The conventional type brush as shown in FIG. 7 (A) has the following unwanted problem. Since the corners 1A are formed by bending the brush shoes 1, the bent portions, that is, the corners 1A tend to be rounded to a certain extent. In general, a lubricant, such as grease, is applied on the surface of the commutator 4. With the conventional type brushgear shown in FIG. 7 (A), the corners 1A, if formed into a rounded shape, cannot completely scrape off the lubricant, resulting in deteriorated contact between the brushes and the commutator due to the lubricant adhering on the brushes.

Another example of the conventional type brushgear shown in FIG. 7 (B) has brush shoes 1 each twisted so that edges 1B, 1B and 1B of the brush shoes 1 can make positive contact with the commutator 4 and the commutator lubricant can be completely scraped off. The brushgear shown in FIG. 7 (B), however, has a problem in that no stable contact can be ensured because of erratic inclination angle of the brush shoes 1.

Still another example of the conventional type brushgear shown in FIGS. 8 (A) and (B) has also the following problem. In this example, corners of the brush shoes 1 are formed into a V shape in cross section by bending the brush shoes 1, as in the case of the example shown in FIG. 7 (A). This tends to cause the corners to be somewhat rounded. In general, abrasion powder 6 produced by the sliding contact between the brush shoes 1 and the commutator 4 tend to adhere on the surface of the commutator 4. In the example shown in FIGS. 8 (A) and (B), the brush shoes 1, if formed into a rounded shape, cannot satisfactorily scrape off the abrasion powder 6, resulting in deteriorated contact with the commutator 4.

To overcome these problems, it has been conceived that the contact positions of the opposing brush shoes 1 and 1 with the commutator 4 are aligned to facilitate the removal of abrasion powder. It is difficult, however, to align the brush shoes 1 and 1 during the assembly work of brushgear in miniature motors in the mass production line because either of the brush shoes 1 and 1 tends to be shifted sideways, as shown by dotted lines in FIG. 8 (B).

SUMMARY OF THE INVENTION

It is the first object of this invention to provide brushgear for miniature motors which ensures stable contact with the commutator by overcoming the above problems.

It is the second object of this invention to provide brushgear for miniature motors which makes it possible to extend the service life of the motor by lessening the wear of the commutator. To this end, the brushgear for miniature motors of this invention comprises a pair of brushes having brush shoes, made of electrically conductive metal strips, for making contact with the commutator of the miniature motor, in which the brush shoes are bent into a V shape in cross section; the feet of the V-shaped brush shoes are adapted to make contact with the commutator.

It is the third object of this invention to provide brushgear for miniature motors in which the sliding contact positions of the brush shoes of the pair of the brushes are disposed apart from each other by a predetermined distance in the axial direction of the commutator.

It is the fourth object of this invention to provide brush-gear for miniature motors in which the brush shoes are disposed in an inclined state in the axial direction of the rotating shaft at a predetermined angle with respect to the tangential direction of the commutator surface.

These and other features and advantages of the invention will become more apparent from the following description with reference to the accompanying drawings.

BRIEF DESCRIPTION OF THE DRAWINGS

FIG. 3 (B) is a diagram illustrating the experiment results on electrical noises for brushgear of this invention.

DETAILED DESCRIPTION OF THE EMBODIMENT

Figure 1:
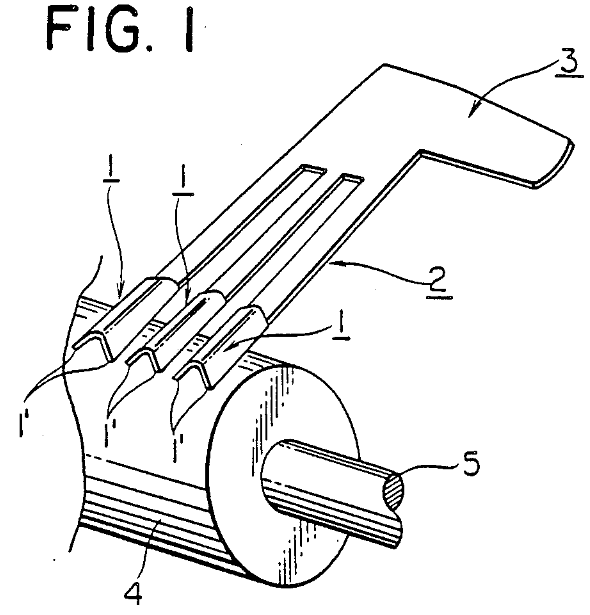
FIG. 1 (A) is a diagram illustrating the first embodiment of this invention.

In the figures, reference numeral 1 refers to a brush shoe; 1' to a foot of the brush shoe 1; 2 to a brush arm; 3 to a brush base; 4 to a commutator; 5 to a motor shaft; 6 to abrasion powder; and 7 to grease, respectively.

The brush in the first embodiment of this invention shown in FIG. 1 has such a construction that the brush shoe 1 is formed into a V shape in cross section, with the feet 1', 1', --- of the V-shaped brush shoe 1 being adapted to make sliding contact with the commutator 4. The brush used in this invention is such that the brush base 3 is supported by a motor case cover (not shown), for example, in a state where the brush arm 2 integrally formed with the brush shoe 1 is bent. Consequently, the brush shoe 1 makes contact with the commutator in such a state that the brush shoe 1 is forced onto the commutator 4 by the resiliency produced by the bent brush arm 2. A good and stable contact between the brush shoes 1, 1, and 1, and the commutator can be ensured because the two feet 1' and 1' of the brush shoe 1 securely makes contact with the commutator 4. Furthermore, the feet 1', 1' --- of the brush shoe 1 having sharp edges facilitate the removal of commutator lubricant, as described at the beginning of the present Specification, leading to improved contact between the brushes and the commutator and stabilized conductivity.

Figure 2:
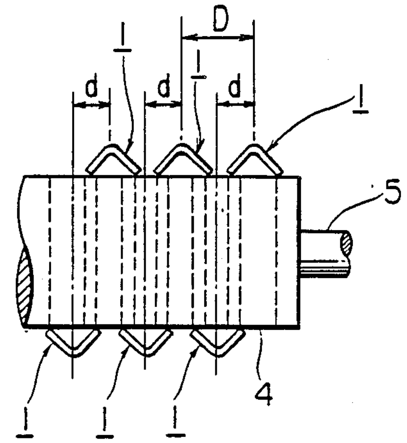
FIG. 2 is a diagram illustrating the second embodiment of this invention.

Although only one piece of brush is shown in FIG. 1, another piece of brush is of course provided in the same manner at the opposite position with respect to the commutator 4, as shown in FIG. 2.

Next, the arrangement of a pair of brushes in the second embodiment of this invention, as shown in FIG. 2, will be described in the following. In the second embodiment of this invention, the relative positions of a pair of brushes in the axial direction of the commutator 4 are such that the brush shoes 1, 1, and 1 disposed apart by a distance D are shifted sideways by a predetermined distance d, as shown in FIG. 2. With this arrangement, the paths on which the pair of brushes slide on the commutator 4 can be completely staggered, as shown by dotted lines in FIG. 2. This results in reduced wear of the commutator by the sliding contact of the brushes, leading to prolonged service life of the motor.

Figure 3A:
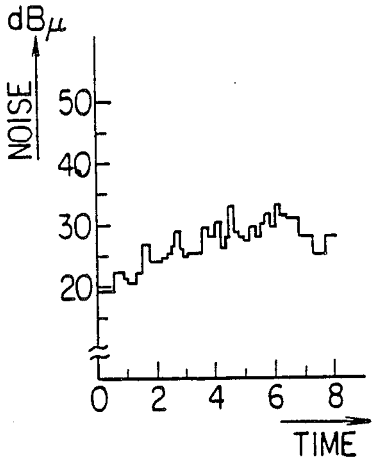
FIG. 3A PRIOR ART
FIG. 3 (A) is a diagram illustrating the experiment results on electrical noises for conventional type brushgear used in miniature motors.
Figure 3B:
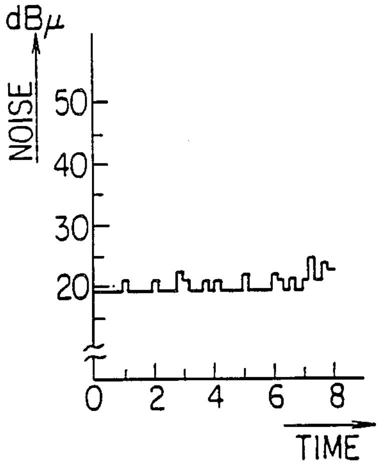

As described above, this invention makes it possible to stabilize the contact state between the brushes and the commutator, thus to remarkably reduce electrical noises generated by the sliding contact between the brushes and the commutator, as shown in FIG. 3B, and to reduce fluctuations in electrical noises even when the motor is kept running for long hours. FIG. 3B shows the results of measurements made by the present Applicant of changes in electrical noises with the lapse of time.

FIG. 3 (A) shows the measurement results of electrical noises in a miniature motor having conventional type brushgear, and FIG. 3 (B) the measurement results of electrical noises in a miniature motor having brushgear of this invention. In FIGS. 3 (A) and (B), the abscissa represents the lapse of time, and the ordinate the electrical noise value (dBu).

Figure 4:
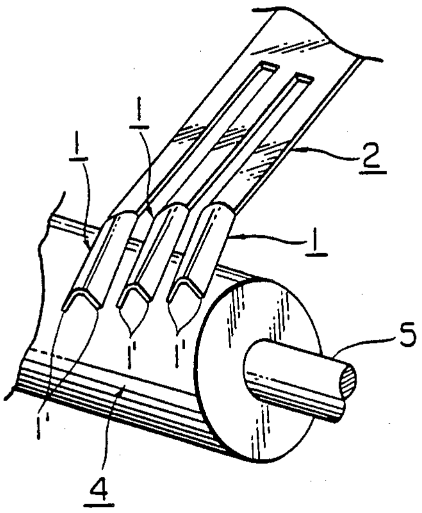
FIG. 4 is a perspective view of the third embodiment of this invention.
Figure 5:
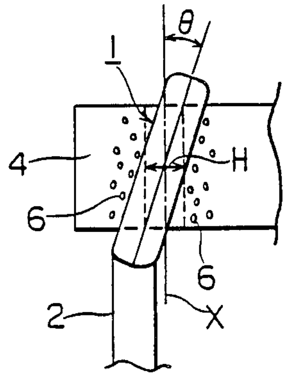
FIG. 5 is a diagram illustrating the state where the brush of this invention makes contact with the commutator, FIGS. 6(A) and (B) are diagrams illustrating the experiment results on electrical noises in miniature motors, FIGS. 7 (A) and (B) are perspective views illustrating conventional type brushes used in miniature motor brushgear, and FIGS. 8 (A) and (B) are diagrams of assistance in explaining conventional type brushgear for miniature motors, respectively.

The brushgear in the third embodiment of this invention has such a construction that the brush shoe 1 is formed into a V shape in cross section and bent at a predetermined angle (as shown by arrow $\theta$ in FIG. 5, which will be described later) with respect to the extending direction of the brush arm 2 so that the feet 1', 1',--- of the V-shaped brush shoe 1 (as shown in FIG. 4) make contact with the commutator 4. The brush used in the third embodiment of this invention is supported by a motor case cover (not shown), for example, in such a state that the brush arm 2 integrally formed with the brush shoe 1 is bent, as with the first and second embodiments. Consequently, the brush shoe 1 makes contact with the commutator 4 in a state where the brush shoe 1 is forced onto the commutator 4 by the resiliency produced by the slightly bent brush arm 2. A good and stable contact between the brush shoes 1, 1, and 1, and the commutator can be ensured because the two feet 1' and 1' of the brush shoe 1 securely makes contact with the commutator 4. Furthermore, the feet 1', 1' --- of the brush shoe 1 having sharp edges facilitate the removal of commutator lubricant, as described at the beginning of the present Specification, leading to improved contact between the brushes and the commutator and stabilized conductivity. Now, description will be made in more detail, referring to FIG. 5. FIG. 5 shows a plan view of a single-shoe brush for ease of description. Since the brush shoe 1 of the single-shoe brush is bent in the axial direction of the rotating shaft at a predetermined angle $\theta$ with respect to the tangential direction of the commutator 4, the foot 1' (similar to the showing of FIG. 4) of the brush shoe 1 makes sliding contact with the commutator 4 during motor rotation, while scraping off the abrasion powder 6 on the commutator surface to produce an area where no abrasion powder 6 is present (shown by arrow H in the figure). The area H has a sufficient width, as shown by dotted lines in FIG. 5, since the brush shoe 1 is inclined at a predetermined angle $\theta$ with respect to the commutator 4. Though not shown in the figure, another piece of brush located at the opposite position also produces an area where no abrasion powder exist. Even when another piece of brush is slightly shifted sideways, the area having no abrasion powder produced by another piece cf brush substantially agrees with the area H produced by the foot 1' of the brush shoe 1 shown in FIG. 5. As a result, the brush shoe 1 makes contact with the commutator 4 almost always within the area having no abrasion powder. This reduces fluctuations in contact resistance.

In the foregoing, description has been made on the sliding contact state between the brush shoe 1 and the commutator 4 in the present invention for a single-shoe brush as shown in FIG. 5. The same applies to a fork-shaped brush having a plurality of brush shoes 1, as shown in FIG. 4. In the embodiment shown in FIG. 1, all the three brush shoes 1 are bent with respect to the brush arms 2. This invention, however, is not limited to this arrangement. In general, almost the same effect can be obtained by bending at least one of the multiple brush shoes 1.

Figure 6A:
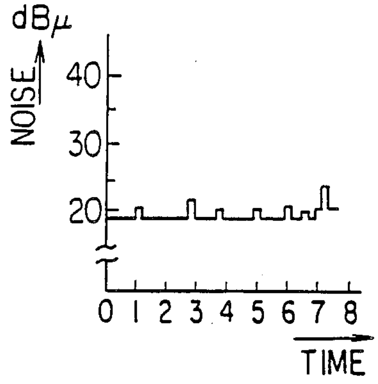
Figure 6B:
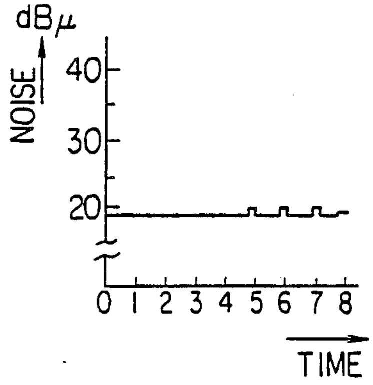
Figure 7A:
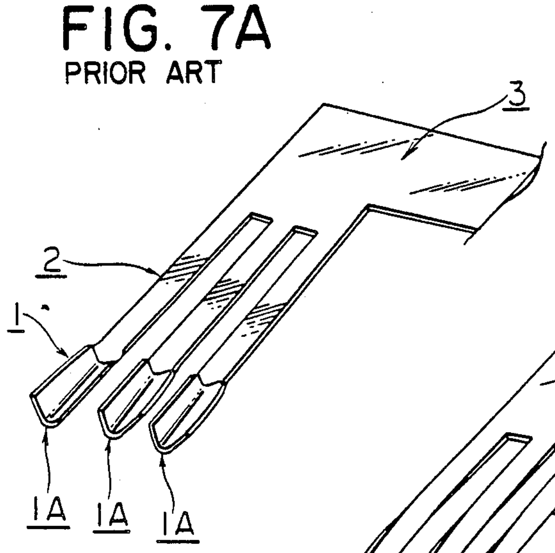
FIG. 7A PRIOR ART
Figure 7B:
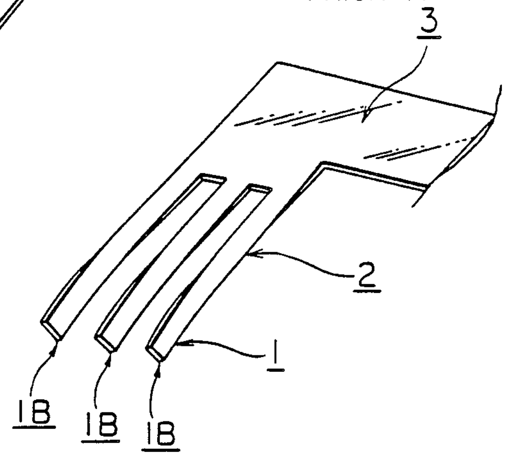
FIG. 7B PRIOR ART
Figure 8A:
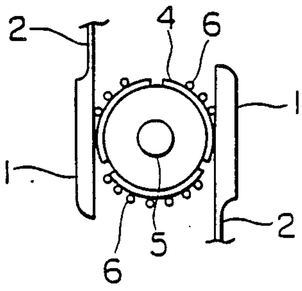
FIG. 8A PRIOR ART
Figure 8B:
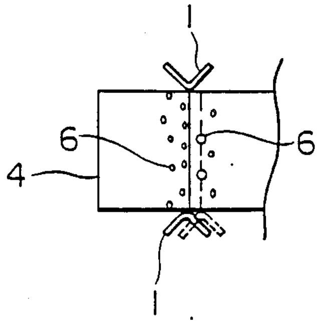
FIG. 8B PRIOR ART

As described above, this invention makes it possible to stabilize the contact state between the brushes and the commutator, thus remarkably reducing electrical noises generated by the sliding contact between the brushes and the commutator, as shown in FIG. 3B, and reducing fluctuations in electrical noises even when the motor is kept running for long hours. FIG. 6 shows the results of measurement made by the present Applicant of changes in electrical noises with the lapse of time. FIG. 6 (A) shows the measurement results of electrical noises in a miniature motor having the brushgear of the first embodiment shown in FIG. 1, FIG. 6 (B) the measurement results of electrical noises in a miniature motor having the brushgear of the third embodiment shown in FIG. 4. In FIGS. 6 (A) and (B), the abscissa represents the lapse of time and the ordinate the electrical noise value (dBu).

As described above, this invention makes it possible to ensure a stable contact between the brushes and the commutator, thus stabilizing power feeding to the rotor windings and reducing unwanted electrical noises. Furthermore, by reducing the wear of the commutator, this invention can contribute much to extending motor life. In addition, with the arrangement that the feet of the brush shoes scrape away abrasion powder from the commutator surface, producing a wide area having no abrasion powder, this invention makes it possible to maintain a good contact between the brushes and the commutator even when the opposing brushes are slightly shifted sideways.

What is claimed is:

1. Commutator brushgear for miniature motor having a rotating shaft with a commutator, comprising a pair of brushes having brush shoes made of electrically conductive metal strips for making sliding contact with said commutator, at least one of said brush shoes being of V-shaped cross section having two spaced apart feet each with ends in sliding contact with said commutator, said two spaced apart feet being oriented so that they are inclined in axial direction of said rotating shaft of said motor at a predetermined angle with respect to a commutator surface.

* * * * *